June 11, 1963 S. LUBKIN 3,093,797

PULSE GENERATOR EMPLOYING LOGIC GATES AND DELAY MEANS

Original Filed July 27, 1953 2 Sheets-Sheet 1

INVENTOR.
SAMUEL LUBKIN

BY Norbert Ederer

ATTORNEY

June 11, 1963 S. LUBKIN 3,093,797

PULSE GENERATOR EMPLOYING LOGIC GATES AND DELAY MEANS

Original Filed July 27, 1953 2 Sheets-Sheet 2

INVENTOR.
SAMUEL LUBKIN
BY Norbert Ederer
ATTORNEY.

United States Patent Office 3,093,797 Patented June 11, 1963

3,093,797

PULSE GENERATOR EMPLOYING LOGIC GATES AND DELAY MEANS

Samuel Lubkin, Bayside, N.Y., assignor, by mesne assignments, to Curtiss-Wright Corporation, Carlstadt, N.J., a corporation of Delaware Original application July 27, 1953, Ser. No. 370,538, now Patent No. 2,934,262, dated Apr. 26, 1960. Divided and this application Mar. 8, 1960, Ser. No. 13,654
12 Claims. (Cl. 328—61)

This invention relates to pulse generating means, and has particular utility, amongst other applications, in the generation of timing signals or clock pulses for high-speed electronic digital computers.

This application is a division of my copending application Serial No. 370,538, filed July 27, 1953, now Patent No. 2,934,262, dated April 26, 1960 and hereinafter referred to as the parent patent.

The invention will be described by way of example with reference to the computer of the parent patent, which computer will be identified simply as "the computer" or "the computer system."

Information is frequently manipulated in the computer as a signal which is a group of pulses which occur during a period of time equal to that occupied by thirty sequential pulses or thirty pulse times. The thirty pulse-time information signal is referred to as a word of information or simply as a word. The pulses representing information occur at a uniform rate; this means that if all possible pulses were present in a word, for example (that is, if the word contained all binary ones and no binary zeros), the time interval between the leading edge (or any specified point) of one pulse and the corresponding point on the preceding or following pulse is a constant. This time interval is called one pulse time. More particularly, the pulse time of the computer is eight and sixty-eight hundredths microseconds.

An object of the invention is the provision of an improved pulse generator for developing sets of timing pulses.

Another object of the invention is to provide an improved pulse generator for deriving pulses of short time duration from comparatively long duration pulses.

A further object of the invention is to provide a network for obtaining frequency multiplication of a fundamental frequency signal by narrowing the time duration of the pulses of the fundamental frequency signal.

Other objects, features and advantages of the invention will appear in the subsequent detailed description which is accompanied by drawings wherein.

Figure 1:
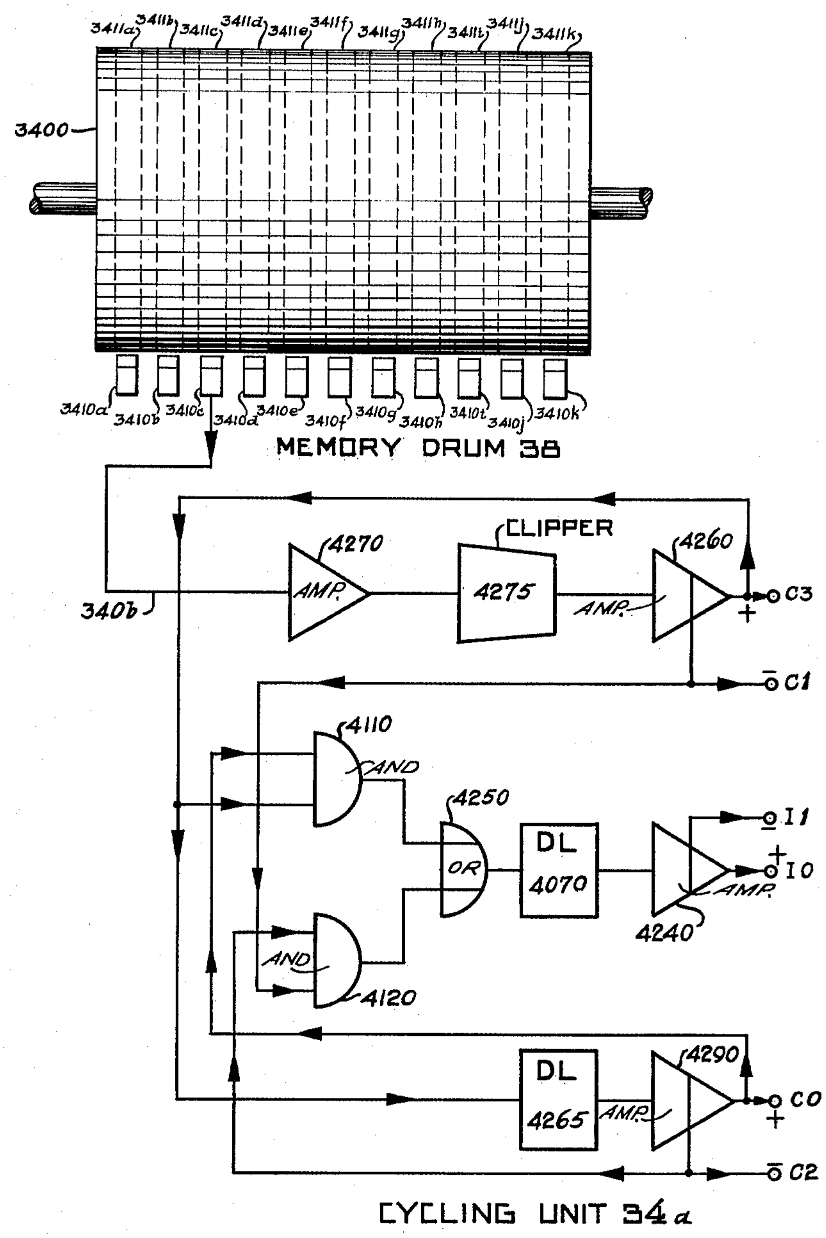
FIG. 1 is a logical diagram of pulse generating means according to a preferred embodiment of the invention, forming a part of the so-called cycling unit of the computer, and is shown in association with the magnetic drum of the computer.
Figure 2:
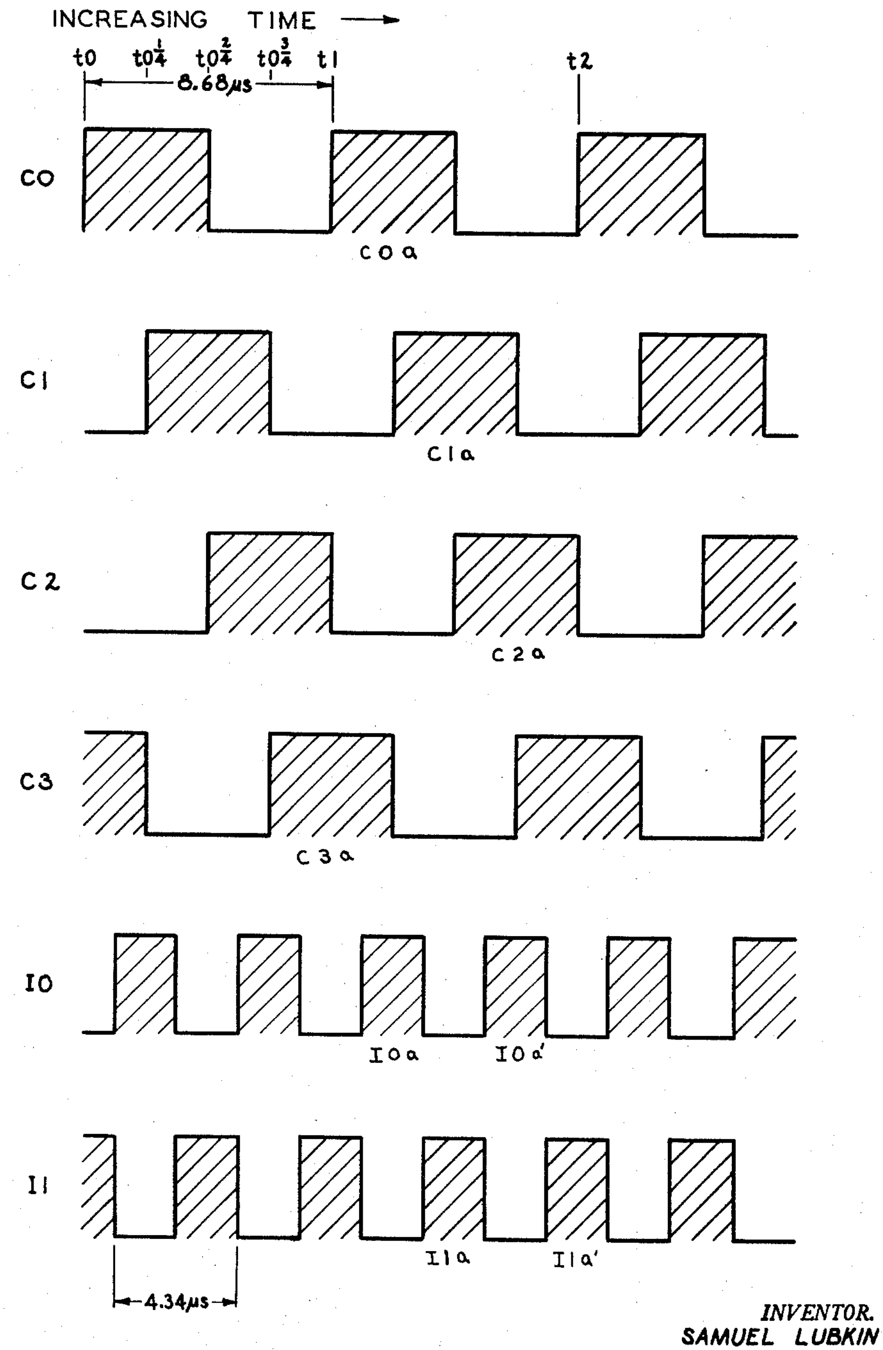
FIG. 2 is a time chart which illustrates the cyclical signals which are generated in the cycling unit.

The apparatus of FIG. 1 incorporates a portion of the circuitry illustrated in FIG. 23 of the parent patent, in association with the memory drum 38 shown in FIG. 22 of the parent patent. The symbolic representation of circuit elements utilized in the parent patent, is utilized herein as well. Also, the individual units illustrated in FIG. 1 are identified by the same respective reference characters as their corresponding units of the parent patent. FIG. 2 is a duplicate of FIG. 25 of the parent patent.

In the immediately following listing of units illustrated in symbolic form in FIG. 1, the parenthetical reference is to the drawing figure number of the parent patent, which shows the same unit in the same symbolic form and also illustrates the corresponding detailed circuitry. The units are described briefly here; for a detailed description the reader is referred to the pertinent description in the parent patent.

Gates 4110 and 4120 (FIG. 19*a*) are of the "coincidence" type, each comprising a network which functions to receive input signals via a plurality of input terminals and to pass the most negative signal. When all the input signals to a given gate are positive, its output signal is positive; otherwise it is negative.

The buffer 4250 (FIG. 19*c*), also known as "or" gate, comprises a network which functions to receive input signals via a plurality of input terminals and to pass the most positive signal. When all the buffer input signals are negative, its output signal is negative; otherwise it is positive.

Delay lines 4070 and 4265 (FIG. 19*e*) are of the lumped parameter type and function to delay received pulses for discrete periods of time. Pulse amplifier 4260 (FIG. 19*g*) is typical also of pulse amplifiers 4240, 4270, and 4290. When a positive pulse is fed to the input of amplifier 4260, its "positive" output terminal C3 delivers a positive pulse, and its "negative" output terminal C1 delivers a negative pulse. At all other times the potential at positive output terminal C3 is negative, and that at negative output terminal C1 is positive. For the pulse amplifier 4270, only the positive output line is illustrated; its negative output line is not used.

The memory drum 38 shown in FIG. 1 comprises the magnetic drum 3400 and the magnetic heads **3410*a* through 3410*k***.

The magnetic drum 3400 is a bronze casting with a magnetizable surface coating, and is positioned by suitable support members and rotated by a suitable motor. The magnetic heads 3410 are also held in fixed positions by suitable support members (not shown).

As the magnetic drum 3400 rotates each of the magnetic heads 3410 scans a corresponding channel 3411 on the magnetizable surface. The channels 3411 circumscribe the periphery of the magnetic drum 3400. Each channel 3411 is of such length that one thousand nine hundred and twenty pulses may be recorded in it corresponding to a maximum of sixty-four words each thirty binary digits long.

Of the eleven channels 3411, only the channel **3411*c* is significant for purposes of the present invention, and therefore only its reproducing head (3410*c*) is indicated with an (outgoing) connecting line (340*b***). For a description of the significance, in the computer, of the remaining channels, and their respective reproducing heads and connecting lines, the reader is referred to columns 90 and 91 of the parent patent.

The channel **3411*c* which will be scanned by the magnetic head 3410*c*** has permanently recorded in it one pulse in each possible pulse position. The total number of pulses in this channel is one thousand nine hundred and twenty (the number of pulses in sixty-four words of thirty pulses each) and these in turn are employed to generate the clock pulses which are used for shaping and timing purposes in the computer system.

The cycling unit **34*a* shown in FIG. 1 receives output signals of the memory drum 38 which are transmitted via the signal line 340*b*. The cycling unit 34*a* is an abridged version of the part cycling unit 34*a* illustrated in FIG. 23 of the parent patent, which together with part cycling unit 34*b* (FIG. 24 of the parent patent) constitutes the complete cycling unit 34. In the computer, the cycling unit 34** functions to convert the received signals into a plurality of cyclical signals which are utilized throughout the computer system to retime and reshape other signals.

The output signals of the cycling unit 34*a* are shown as being conducted to output terminals. It should be understood that a line which is illustrated as carrying a particular cyclical signal is connected to the corresponding output terminal in the cycling unit 34*a*.

Pulses are transmitted via the cyclical signal line 340*b* from the magnetic drum to the cycling unit 34*a* at a rate of one hundred fifteen and two-tenths thousand per second. These pulses are sequentially fed via the cyclical signal line 340*b* to the amplifier 4270 and are amplified. The amplified pulses are then fed to the clipper 4275, which may be any suitable clipping circuit, and are shaped into square-wave pulses. These square-wave pulses are fed to and amplified by the amplifier 4260.

The pulses which constitute the signal at the positive output of the amplifier 4260 are hereinafter identified as C3 pulses. The positive swing portion of the pulses which constitute the signal at the negative output of the amplifier 4260 are hereinafter designated C1 pulses. The C1 and C3 pulses are one hundred eighty degrees out of phase. The phase relationship is shown in FIG. 2. The C pulses determine the period of a pulse time which is 8.68 microseconds long.

The positive output of the amplifier 4260 (see FIG. 1) is also fed through the delay line 4265 where the pulses are delayed for one-quarter of a pulse time and are then fed to and amplified by the amplifier 4290. The pulses which constitute the signal at the positive output of the amplifier 4290 are hereinafter identified as C0 pulses. The positive swing portions of the pulses which constitute the signal at the negative output of the amplifier 4290 are hereinafter designated C2 pulses. As were the C1 and C3 pulses, the C0 and C2 pulses are one hundred eighty degrees out of phase with each other. Furthermore, the C0 pulses lag their originating C3 pulses by one-quarter of a pulse time or ninety degrees, and the C2 pulses lag their corresponding C1 pulses by one-quarter of a pulse time or ninety degrees. This phase relationship is shown in FIG. 2; for example, pulse C0*a* lags pulse C3*a* and pulse C2*a* lags pulse C1*a*.

The C0 and C3 pulses are transmitted to the gate 4110 (see FIG. 1). Since corresponding C0 and C3 pulses are ninety degrees out of phase and overlap each other for a quarter-pulse period, there is a signal output from the gate 4110 of pulses having a width equal to one-half of the width of the C0 and C3 pulses. These narrow pulses begin at the earliest coincidence of a C0 and C3 pulse at the input terminal of the gate 4110 and terminate when the C3 pulse terminates.

More particularly, the C3*a* pulse which is transmitted to the gate 4110 will prime the gate 4110 so that when the C0*a* pulse arrives one-quarter of a pulse time later it will be gated through. The termination of the C3 pulse one-quarter of a pulse time after the initiation of the narrowed pulse blocks the C0 pulse at the gate 4110 and thereby terminates the narrow pulse.

In an identical manner, C1 and C2 pulses are transmitted to the gate 4120 and form narrow pulses. The narrow pulses formed by C1 and C2, and by C0 and C3 occur alternately and are fed via the buffer 4250 through the delay line 4070 where they are delayed for one-eighth of a pulse time and are then fed to the amplifier 4240.

The narrow pulses are amplified by the amplifier 4240. Pulses from the positive output of the amplifier 4240 are hereinafter identified as I0 pulses, and the positive swing portion of the pulses from the negative output of the amplifier 4240 are hereinafter designated I1 pulses.

I1 and I0 are narrow pulses which are one hundred eighty degrees out of phase with each other. This phase relationship is shown by the pulses I0*a* and I1*a* which are generated by the pulses C0*a* and C3*a* as is illustrated in FIG. 2. I1 and I0 are utilized as inputs to numerous gates and function to remove objectionable spikes from pulses circulating in the computer system by permitting these gates to pass signals only for the duration of the I pulses. It should be noted that the I0 pulses always occurs during the middle of the C0 pulse, and that the I1 pulse always occurs during the middle of the C1 pulse.

C0, C1, C2 and C3 are clocking pulses which establish the basic timing of the computer system and which are used to synchronize other pulses with this basic timing. C pulses are also utilized for reshaping purposes.

While the novel features of the invention as applied to a preferred embodiment have been shown and described, it will be understood that various omissions and substitutions in the form and details of the device illustrated and changes in its operation may be made by those skilled in the art without departing from the spirit of the invention.

What is claimed is:

1. A narrow pulse generator comprising a source producing a first and second primary series of periodic pulses which are of opposite polarities and of like amplitudes and a first and second secondary series of periodic pulses which are delayed with respect to said primary series of periodic pulses and are of opposite polarities and of like amplitudes, and means responsive to said primary series of periodic pulses and to said delayed secondary series of periodic pulses for producing a first series of short duration pulses, and a second series of short duration pulses.

2. A narrow pulse generator comprising a source producing a first and second primary series of periodic pulses which are of opposite polarities and of like amplitudes and a first and second secondary series of periodic pulses which are delayed with respect to said primary series of periodic pulses and are of opposite polarities and of like amplitudes, each pulse of said primary and secondary series having a rising portion and a trailing portion, and gating means responsive to said primary series of periodic pulses and to said delayed secondary series of periodic pulses for producing a first series of short duration pulses corresponding in time to the trailing portions of one of said primary series of periodic pulses and to the leading portions of one of said secondary series of periodic pulses and a second series of short duration pulses corresponding in time to the trailing portions of the other one of said primary series of periodic pulses and the leading portions of the other one of said secondary series of periodic pulses.

3. A narrow pulse generator comprising a first source producing a first and second primary series of periodic pulses which are of opposite polarities and of like amplitudes, a second source producing a first and second secondary series of periodic pulses which are delayed with respect to said primary series of periodic pulses and are of opposite polarities and of like amplitudes, each pulse of said primary and secondary series having a rising portion and a trailing portion, a first gate responsive to one of said primary series of periodic pulses and to one of said delayed secondary series of periodic pulses for producing a first series of short duration pulses corresponding in time to the trailing portions of said one of said primary series of periodic pulses and to the leading portions of said one of said secondary series of periodic pulses, and a second gate responsive to the other one of said primary series of periodic pulses and to the other one of said secondary series of periodic pulses for producing a second series of short duration pulses corresponding in time to the trailing portions of said other one of said primary series of periodic pulses and the leading portions of said other one of said secondary series of periodic pulses.

4. A frequency multiplier comprising means for producing a first and second original series of pulses recurring at a fundamental frequency and a first and second succeeding series of pulses delayed with respect to said original series of pulses and recurring at said fundamental frequency, means responsive to said original series of pulses and to said succeeding series of pulses for producing a first and a second series of pulses, and means alternately responsive to the latter first and second series of pulses for producing a series of pulses recurring at a frequency which is twice the fundamental frequency.

5. A frequency multiplier comprising a source of pulses, a first means responsive to said source for producing a first and second original series of pulses recurring at a fundamental frequency, a second means responsive to one of said original series of pulses for producing a first and second suceeding series of pulses delayed with respect to said original series of pulses recurring at said fundamental frequency, gate means responsive to said original series of pulses and to said succeeding series of pulses for producing a first series of pulses corresponding in time to the trailing edges of one of said original series of pulses and the leading edges of one of said succeeding series of pulses and a second series of pulses corresponding in time to the trailing edges of the other one of said original series of pulses and the leading edges of the other one of said succeeding series of pulses, and means alternately responsive to said first and second series of pulses for producing a third series of pulses recurring at a frequency which is twice the fundamental frequency.

6. In a computer, a frequency multiplying network comprising a source of pulses, a first means including an amplifier responsive to said source for producing a first and second original series of pulses which are of opposite polarities and of like amplitudes recurring at a fundamental frequency, a second means including an amplifier responsive to one of said original series of pulses for producing a first and second succeeding series of pulses delayed with respect to said original series of pulses and which are of opposite polarities and of like amplitudes recurring at said fundamental frequency, a first gate responsive to one of said original series of pulses and to one of said succeeding series of pulses for producing a first series of pulses corresponding in time to the trailing edges of one of said original series of pulses and the leading edges of one of said succeeding series of pulses, a second gate responsive to the other one of said original series of pulses and to the other one of said succeeding series of pulses for producing a second series of pulses corresponding in time to the trailing edges of said other one of said original series of pulses and the leading edges of said other one of said succeding series of pulses, and means alternately responsive to said first and second series of pulses for producing a third series of pulses recurring at a frequency which is twice the fundamental frequency.

7. In a pulse generating system having means providing four original substantially symmetrical square wave pulse trains which are of the same fundamental frequency and are successively delayed with respect to each other by one quarter of the period of pulse repetition: a frequency multiplying network comprising means responsive to coincidence of one set of two of said original pulse trains separated by said one quarter pulse period to produce a train of narrow pulses at said fundamental frequency and of width which is essentially one quarter of said period, means responsive to coincidence of the remaining set of two original pulse trains to produce a like train of narrow pulses delayed with respect to the first-mentioned narrow pulse train by one half of said pulse period, and means alternately responsive to said two narrow pulse trains to produce an essentially symmetrical square wave pulse train at double said fundamental frequency.

8. In a pulse generating system having means providing four original substantially symmetrical square wave pulse trains which are of the same fundamental frequency and are successively delayed with respect to each other by one quarter of the period of pulse repetition: a frequency multiplying network comprising means responsive to coincidence of one set of two of said original pulse trains separated by said one quarter pulse period to produce a train of narrow pulses at said fundamental frequency and essentially occurring during the one quarter pulse periods of overlap of pulses of such one set, means responsive to coincidence of the remaining set of two original pulse trains to produce a like train of narrow pulses delayed with respect to the first-mentioned narrow pulse train by one half of said pulse period, means alternately responsive to said two narrow pulse trains to produce an essentially symmetrical square wave pulse train at double said fundamental frequency, and delay means responsive to the latter square wave train to produce a delayed double fundamental frequency and essentially symmetrical square wave pulse train having pulses centered alternately in a pulse of one and in a pulse of the other of two of said original pulse trains delayed with respect to each other by one half of said pulse period.

9. In a pulse generating system having means providing four original substantially symmetrical square wave pulse trains which are of the same fundamental frequency and are successively delayed with respect to each other by one quarter of the period of pulse repetition: a frequency multiplying network comprising a first gate responsive to coincidence of one set of two of said original pulse trains separated by said one quarter pulse period to produce a train of narrow pulses at said fundamental frequency and of width which is essentially one quarter of said period, a second gate responsive to coincidence of the remaining set of two original pulse trains to produce a like train of narrow pulses delayed with respect to the first-mentioned narrow pulse train by one half of said pulse period, and circuit means alternately responsive to said two narrow pulse trains to produce an essentially symmetrical square wave pulse train at double said fundamental frequency.

10. In a pulse generating system having means providing four original substantially symmetrical square wave pulse trains which are of the same fundamental frequency and are successively delayed with respect to each other by one quarter of the period of pulse repetition: a frequency multiplying network comprising a first gate responsive to coincidence of one set of two of said original pulse trains separated by said one quarter pulse period to produce a train of narrow pulses at said fundamental frequency and occurring essentially during the one quarter pulse periods of overlap of pulses of such one set, a second gate responsive to coincidence of the remaining set of two original pulse trains to produce a like train of narrow pulses delayed with respect to the first-mentioned narrow pulse train by one half of said pulse period, circuit means alternately responsive to said two narrow pulse trains to produce an essentially symmetrical square wave pulse train at double said fundamental frequency, and a delay line responsive to the latter square wave train to produce a delayed double fundamental frequency and essentially symmetrical square wave pulse train having pulses centered alternately in a pulse of one and in a pulse of the other of two of said original pulse trains delayed with respect to each other by one half of said pulse period.

11. In a pulse generating system having means providing four original substantially symmetrical square wave pulse trains which are of the same fundamental frequency and are successively delayed with respect to each other by one quarter of the period of pulse repetition: a frequency multiplying network comprising means responsive to coincidence of one set of two of said original pulse trains separated by said one quarter pulse period to produce a train of narrow pulses at said fundamental frequency and essentially occurring during the one quarter pulse periods of overlap of pulses of such one set, means responsive to coincidence of the remaining set of two original pulse trains to produce a like train of narrow pulses delayed with respect to the first-mentioned narrow pulse train by one half of said pulse period, means alternately responsive to said two narrow pulse trains to produce an essentially symmetrical square wave pulse train at double said fundamental frequency, and means, including delay means and an amplifier, responsive to the latter square wave train to produce two phase opposition delayed double fundamental frequency and essentially symmetrical square wave pulse trains, each having pulses centered alternately in a pulse of one and in a pulse of the other of two of said original pulse trains delayed with respect to each other by one half of said pulse period.

12. In a pulse generating system having means providing four original substantially symmetrical square wave pulse trains which are of the same fundamental frequency and are successively delayed with respect to each other by one quarter of the period of pulse repetition: a frequency multiplying network comprising a first gate responsive to coincidence of one set of two of said original pulse trains separated by said one quarter pulse period to produce a train of narrow pulses at said fundamental frequency and occurring essentially during the one quarter pulse periods of overlap of pulses of such one set, a second gate responsive to coincidence of the remaining set of two original pulse trains to produce a like train of narrow pulses delayed with respect to the first-mentioned narrow pulse train by one half of said pulse period, circuit means alternately responsive to said two narrow pulse trains to produce an essentially symmetrical square wave pulse train at double said fundamental frequency, and means, including a delay line and an amplifier, responsive to the latter square wave train to produce two phase opposition delayed double fundamental frequency and essentially symmetrical square wave pulse trains, each having pulses centered alternately in a pulse of one and in a pulse of the other of two of said original pulse trains delayed with respect to each other by one half of said pulse period.

References Cited in the file of this patent

UNITED STATES PATENTS

| | | |
|---|---|---|
| Re. 24,240 | Canfora | Nov. 27, 1956 |
| 2,558,447 | MacSorley | June 26, 1951 |
| 2,568,918 | Grosdoff | Sept. 25, 1951 |
| 2,605,405 | Lentz | July 29, 1952 |
| 2,798,156 | Selmer | July 2, 1957 |
| 2,813,200 | Heber | Nov. 12, 1957 |
| 2,831,184 | Petherick | Apr. 15, 1958 |
| 2,845,617 | Turvey | July 29, 1958 |
| 2,878,382 | Creveling | Mar. 17, 1959 |
| 2,889,454 | Hoffman et al. | June 2, 1959 |
| 2,889,457 | Fischer et al. | June 2, 1959 |
| 2,890,333 | Zinn | June 9, 1959 |
| 2,904,685 | Salmet | Sept. 15, 1959 |
| 2,915,635 | Rockafellow et al. | Dec. 1, 1959 |
| 2,935,609 | Robin et al. | May 3, 1960 |